United States Patent [19]

Parulski et al.

[11] Patent Number: 5,900,909
[45] Date of Patent: May 4, 1999

[54] ELECTRONIC STILL CAMERA HAVING AUTOMATIC ORIENTATION SENSING AND IMAGE CORRECTION

[75] Inventors: Kenneth A. Parulski; Warren D. Severin, both of Rochester, N.Y.; Seishi Ohmori, Setagaya-ku, Japan; Masaki Izumi, Yokohama, Japan; Seiichi Mizukoshi, Chigasaki, Japan

[73] Assignee: Eastman Kodak Company, Rochester, N.Y.

[21] Appl. No.: 08/895,971

[22] Filed: Jul. 17, 1997

Related U.S. Application Data

[63] Continuation of application No. 08/421,715, Apr. 13, 1995.

[51] Int. Cl.⁶ .............................. H04N 5/76; H04N 5/262
[52] U.S. Cl. ........................ 348/232; 348/239; 348/552; 358/906; 382/296; 396/321
[58] Field of Search ................................. 348/96, 97, 98, 348/207, 208, 220, 222, 239, 373, 374, 333, 334, 231, 232, 233, 552; 358/452, 453, 906, 909.1; 396/310, 311, 321, 373, 378, 381; 382/289, 293, 295, 296, 297; H04N 5/225, 5/262, 5/222, 5/76

[56] References Cited

U.S. PATENT DOCUMENTS

| 4,364,650 | 12/1982 | Terashita et al. ........................... 354/31 |
| 4,607,949 | 8/1986 | Hakamada et al. ........................ 355/40 |
| 4,641,198 | 2/1987 | Ohto et al. ................................. 358/285 |
| 4,642,700 | 2/1987 | Ohta et al. ................................. 358/285 |
| 4,666,275 | 5/1987 | Tamamura ................................. 354/126 |
| 4,801,793 | 1/1989 | Vaynshteyn ......................... 354/289.12 |
| 5,023,656 | 6/1991 | Terashita ................................... 355/41 |
| 5,122,827 | 6/1992 | Saegusa et al. .......................... 354/410 |
| 5,128,702 | 7/1992 | Ogawa et al. ............................ 354/106 |
| 5,146,258 | 9/1992 | Bell et al. ................................. 354/432 |
| 5,227,889 | 7/1993 | Yoneyama et al. ...................... 358/222 |
| 5,235,427 | 8/1993 | Kim ........................................... 358/222 |
| 5,239,333 | 8/1993 | Takagi ...................................... 354/402 |
| 5,262,867 | 11/1993 | Kojima ..................................... 358/209 |
| 5,270,831 | 12/1993 | Parulski et al. .......................... 358/403 |
| 5,274,418 | 12/1993 | Kazami et al. ............................. 355/40 |
| 5,295,077 | 3/1994 | Fukuoka et al. ......................... 358/479 |
| 5,363,169 | 11/1994 | Ishida et al. ............................. 354/442 |
| 5,410,415 | 4/1995 | Parulski et al. .......................... 358/403 |
| 5,576,759 | 11/1996 | Kawamura et al. ..................... 348/231 |
| 5,640,627 | 6/1997 | Nakano et al. .......................... 396/296 |

FOREIGN PATENT DOCUMENTS

| 0462905 | 12/1991 | European Pat. Off. ......... H04N 1/21 |
| 59-225667 | 12/1984 | Japan ............................... H04N 1/00 |
| 01130675 | 5/1989 | Japan ............................. H04N 5/225 |
| 07095466 | 4/1995 | Japan ............................. H04N 5/232 |
| WO 91/18318 | 11/1991 | WIPO ............................. G03B 17/18 |

*Primary Examiner*—Wendy Garber
*Assistant Examiner*—Ngoc-Yen Vu
*Attorney, Agent, or Firm*—Pamela R. Crocker

[57] ABSTRACT

An electronic still camera is provided with an electronic image sensor for generating an image signal corresponding to a still image of a subject and an orientation determination section for sensing the orientation of the camera relative to the subject. The orientation determination section provides an orientation signal recognizing either the vertical or the horizontal orientation of the camera relative to the subject. An image processor is responsive to the orientation signal for processing the image signal and correcting the orientation thereof so that the still image is output from the image processor in a predetermined orientation. In this way, the electronic still camera can be positioned in a variety of orientations relative to a subject, including both clockwise and counterclockwise vertical "portrait" orientations and a horizontal "landscape" orientation, without affecting the orientation of the images output by the camera.

2 Claims, 6 Drawing Sheets

ELECTRONIC STILL CAMERA HAVING AUTOMATIC ORIENTATION SENSING AND IMAGE CORRECTION

This is a Continuation of application Ser. No. 08/421,715, filed Apr. 13, 1995.

FIELD OF THE INVENTION

This invention pertains to the field of electronic still imaging and, more specifically, to a hand-held electronic still camera capable of being held in various orientations relative to a subject.

BACKGROUND OF THE INVENTION

In conventional video cameras (such as 8 mm camcorders), which display an image on a television screen, the camera must be held in the normal horizontal (or "landscape") orientation to obtain a properly oriented image. If the camera is rotated to a vertical (or "portrait") orientation, the displayed television image will likewise be rotated, unless the display screen or viewer are rotated, which is impractical in most television applications. This situation is even more of a problem in practice because there are actually two "portrait" orientations, one for clockwise rotation and the other for counterclockwise rotation. The result is shown in FIG. 1, where for the two "portrait" orientations, the sky appears at the left or right of the screen, rather than at the top. In conventional film-based photography, the film camera may be rotated to any orientation. When vertical "portrait" camera orientations are used to take pictures, the resulting prints are simply rotated when viewed or, alternatively, slides are simply rotated in the viewing projector.

Recent electronic still cameras, such as the Kodak DC 40 camera (sold by Eastman Kodak Co.), allow the user to take still images and display them on a computer screen. Like film cameras, these electronic cameras can be easily rotated so that the image can be composed in either the horizontal "landscape" orientation, or either of the two vertical "portrait" orientations. However, the images initially displayed on the computer screen always assume that the camera was held in the horizontal position. As a result, any pictures taken with the camera in the "portrait" orientations will be rotated so that the sky (upper part of the picture) is at the left or right, rather than at the top. Some computer image processing software, such as Adobe Photoshop™ (sold by Adobe Corp.), allows images stored in a computer to be rotated to their proper orientation. However, this is a "manual", time-consuming step, which requires the user to select each and every "portrait" orientation image and perform the proper clockwise or counterclockwise rotation.

Automatic reorientation in a special "album" application is shown in U.S. Pat. No. 5,274,418, as follows. A still video camera captures a plurality of pictures with control information for assembling the pictures into album-like pages. The camera includes an orientation detector that marks the output medium as to orientation. A separate player reads the orientation data and adjusts the images as necessary for proper placement on an album-like page display. This imaging system requires special application programs in the player, which means the orientation correction is dependent upon use with that specific player. As a result, the reorientation is "automatic" only if used with the special application programs in the special player.

Another type of picture processing corrects for unwanted tilting of the camera. As shown in U.S. Pat. No. 5,227,889, a video camera detects, and corrects for, the amount of slant of the entire camera in the vertical direction, due to inclination of the video camera while, e.g., walking. The slant is corrected by controlling the addressing of two field memories, depending on the slant information, thereby delivering an output signal that is corrected for slant of the output moving picture signals in real time. As a result, unwanted camera orientations are corrected in the output signal. While correcting for accidental slant of a motion video camera may make good sense, a still camera is frequently maneuvered so as to purposefully take a slanted picture, e.g., to include all desired picture detail in the still picture. A continuous slant correction would defeat this capability. The problem, in other words, is not with the handling of unwanted situations such as picture slant, but with the handling of desired situations, such as "portrait" orientations, and the provision of appropriate corrections for those situations.

SUMMARY OF THE INVENTION

The problems heretofore described appear in an electronic still camera which can be positioned in a variety of orientations relative to a subject, including a vertical "portrait" orientation and a horizontal "landscape" orientation. In solving these problems according to the teaching of the invention, the camera is provided with an electronic image sensor for generating an image signal corresponding to a still image of the subject and an orientation determination section for sensing the orientation of the camera relative to the subject. The orientation determination section provides an orientation signal indicating at least the vertical orientation of the camera relative to the subject. An image processor in the camera is responsive to the orientation signal for processing the image signal and correcting the orientation thereof so that the still image is output from the camera in a predetermined orientation.

More specifically, the electronic still camera includes orientation sensors, such as a pair of mercury switches, which determine whether the user is holding the camera in the normal horizontal "landscape" orientation when taking a picture, or in a vertical "portrait" orientation. The image is rotated in the camera and always stored in the same orientation (i.e., horizontal).

ADVANTAGEOUS EFFECT OF THE INVENTION

Since the image is rotated in the camera, so that the stored image always has the proper orientation, a main advantage of the invention is that the image is then correctly displayed on the screen of a player/computer without need for a special application program.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
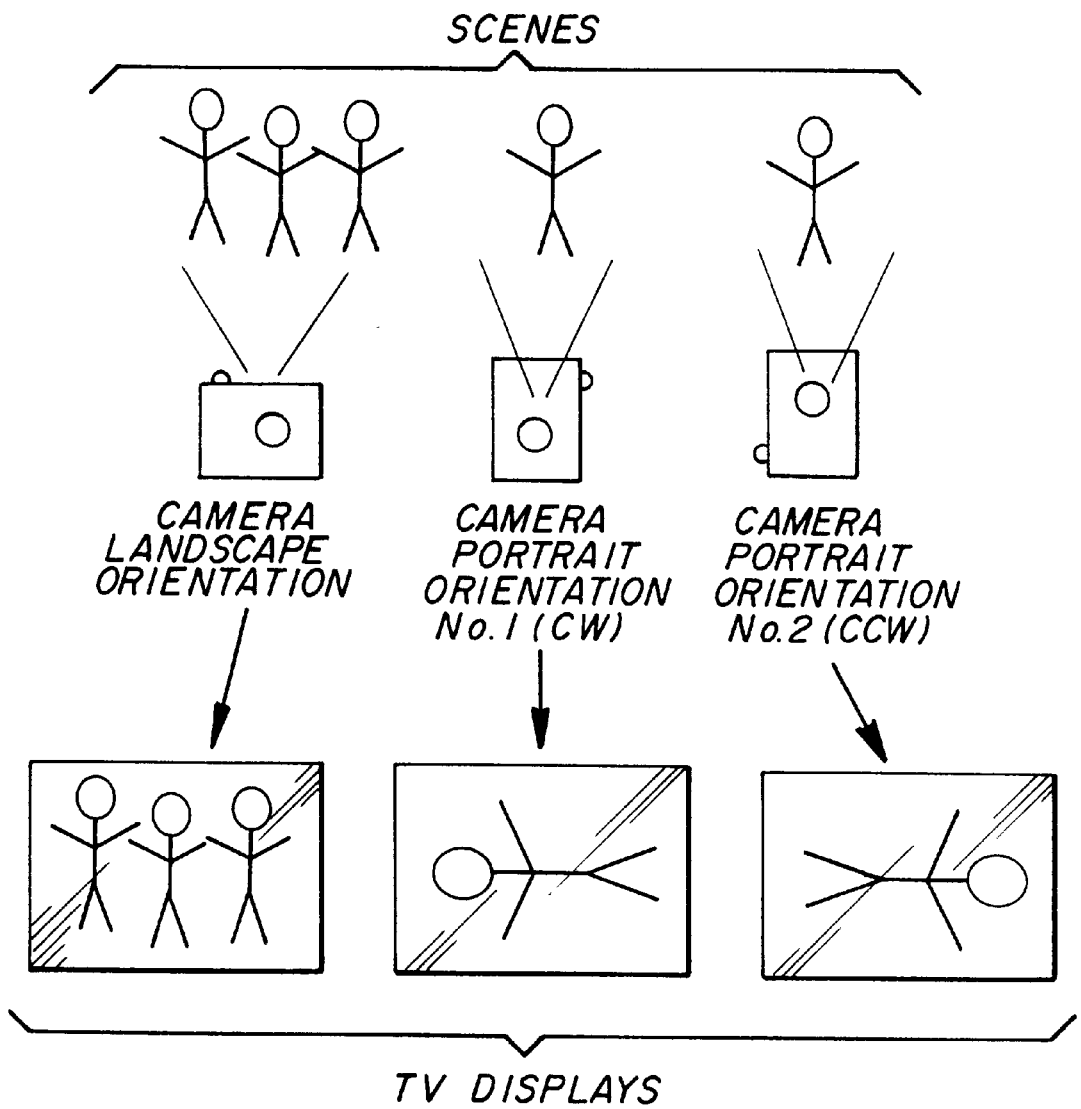
FIG. 1 is an illustration of the situation in the prior art, wherein vertical "portrait" pictures are shown incorrectly oriented on a display screen.
Figure 2:
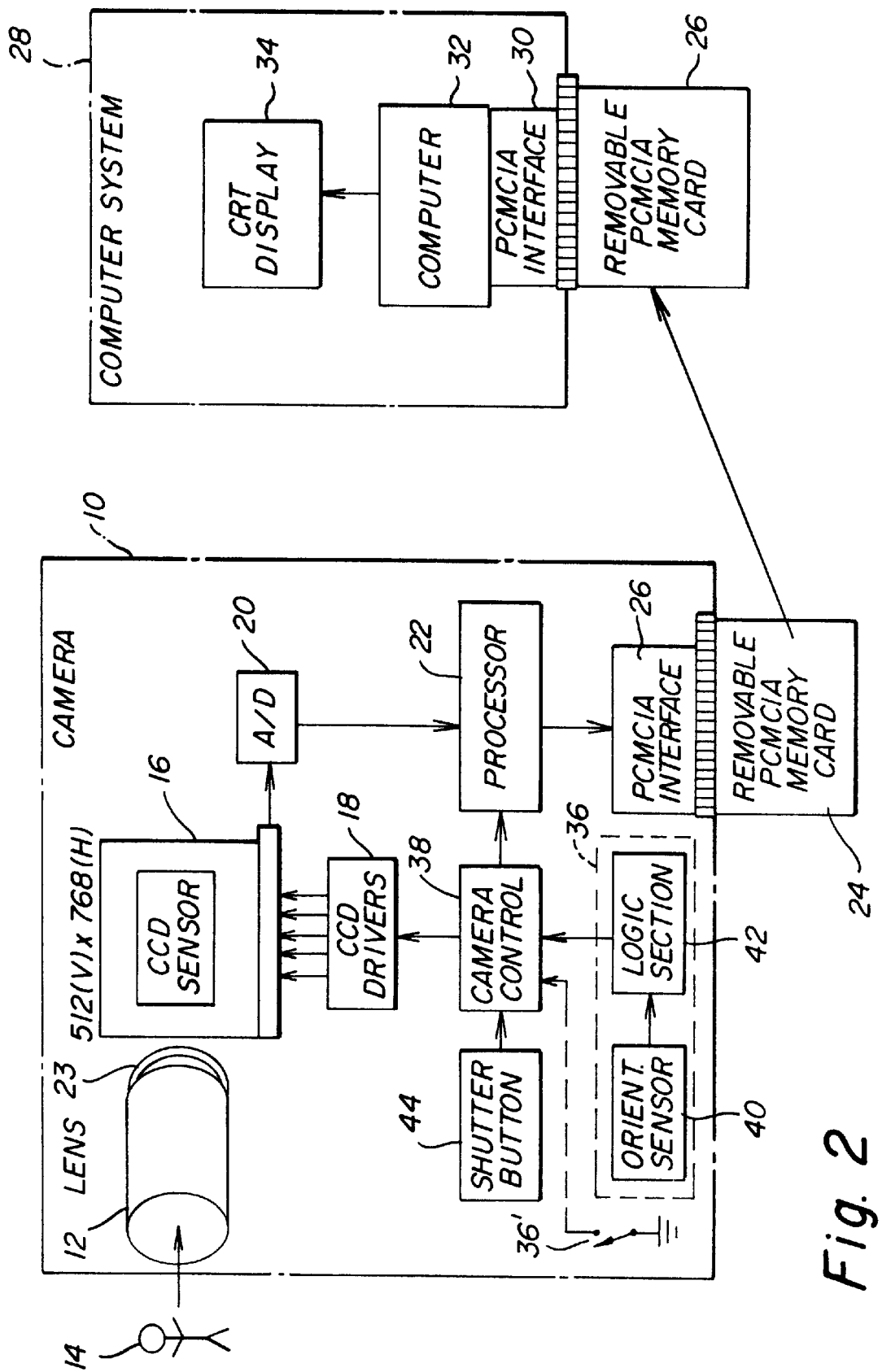
FIG. 2 is a block diagram of an imaging system, including an electronic still camera having orientation correction according to the invention.

A block diagram of an electronic camera 10 using automatic orientation correction according to the invention is shown in FIG. 2. The camera is ordinarily a hand-held unit including a lens 12 for focusing an image of a subject 14 on a charge-coupled device (CCD) image sensor 16. The sensor 16 is clocked by a CCD driver circuit 18 to produce an analog image signal corresponding to a still image of the subject, and the image signal is converted to a digital image signal by an analog-to-digital (A/D) converter 20. The exposure time is controlled by a conventional diaphragm 23, which regulates the aperture of the lens 12, and by conventional electronic shuttering of the image sensor 16 by use of the CCD driver circuit 18. (Alternatively, a mechanical shutter (not shown) can be used.) The digital image signal is processed by an image processor 22 and stored in a digital memory, such as a removable solid-state memory card 24, which has memory for storing a plurality of processed digital images. The CCD image sensor 16 may be a Kodak model KAF-0400C CCD sensor, which has 512 lines of photoelements, with 768 photoelements per line. Since the spacing between photoelements is 9 microns in both the vertical and horizontal directions, the KAF-0400C sensor has "square" pixels and a 3:2 horizontal aspect ratio.

The memory card 24 is preferably configured according to the well-known PCMCIA card interface standard described in the PC Card Standard. Release 2.0, published by the Personal Computer Memory Card International Association, Sunnyvale, Calif., September, 1991. The standard prescribes interface pin assignments for coupling the memory card 24 to the camera 10 through a PCMCIA interface 26, from which it can be removed from the camera 10. Once removed, the card 24 may be inserted into a computer 28 through a similar PCMCIA interface 30. A central processor 32 in the computer 28 reads the image signal from the memory card 26 and provides the image signal to a display 34, so that the images can be displayed on the computer system. Alternatively, a solid-state memory corresponding to the memory card 24 can be fixed inside the camera, and the camera itself can be "tethered" to the computer by an interface cable (not shown) so that the images can be downloaded and displayed. In either case, the images are displayed in the correct orientation for proper viewing.

As an aspect of the invention, the camera includes an orientation determination section 36, which determines whether the camera is in the horizontal "landscape" orientation, or the first (clockwise) or second (counterclockwise) vertical "portrait" orientations. (As described later in connection with FIG. 9, the orientation determination section 36 could also determine when the camera is being held upside down in an inverted horizontal position.) The orientation determination section 36 includes one or more orientation sensors 40 and a logic section 42 that produces an orientation signal indicating the orientation of the camera relative to the subject. The orientation signal is applied to a camera control interface 38. The orientation signal indicates at least the vertical orientation of the camera (the absence thereof, in that case, indicating a horizontal orientation), or, alternatively, the orientation signal may provide positive indication of either the vertical or the horizontal orientation of the camera. When signaled by a shutter button 44, the camera control interface 38 instructs the CCD driver circuit 18 to begin clocking an image signal from the sensor 16. At the same time, the interface 38 applies the orientation signal from the orientation determination section 36 to the image processor 22. The image processor 22 is responsive to the orientation signal for processing the image signal and correcting the orientation thereof so that the still image is output from the image processor 22 in a predetermined orientation for storage in the memory card 24, and subsequent imaging on the display 34. Ordinarily, the predetermined orientation is the same for all images, and the image processor 22 converts the vertically oriented images into horizontally oriented images. Note that for landscape orientation, the image is 512(V)×768(H), but for the two portrait orientations, the stored image is 768(V)×512(H).

Figure 8:
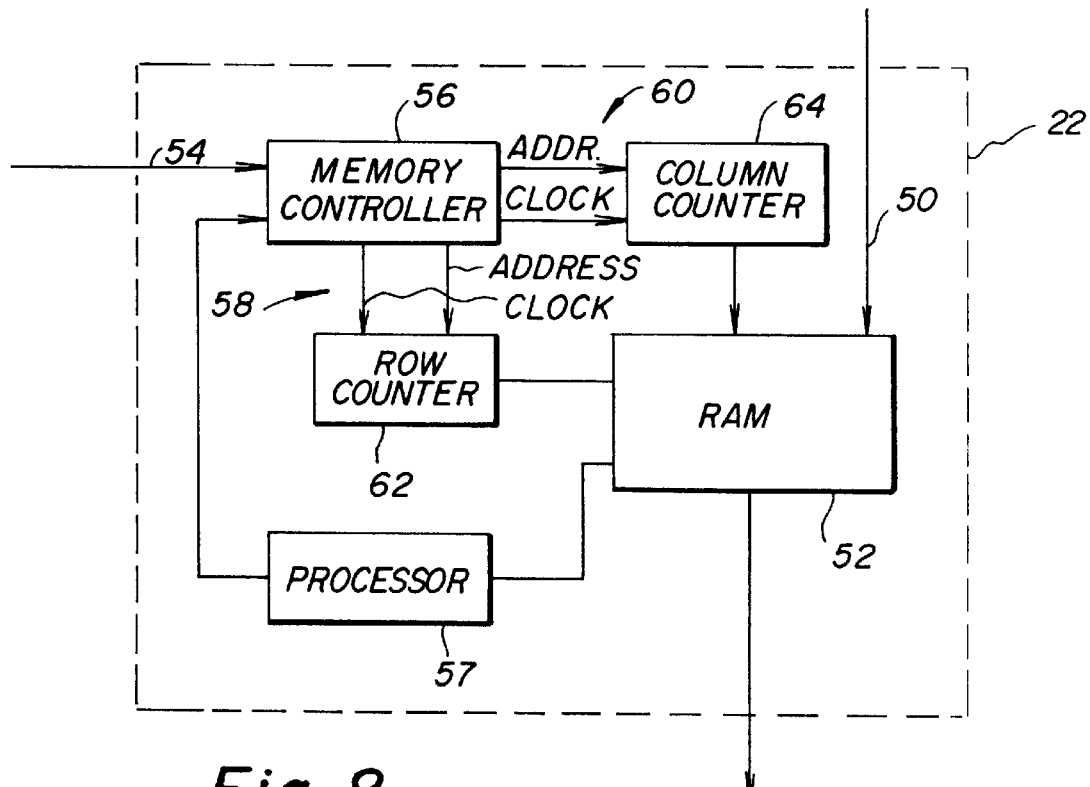
FIG. 8 shows an embodiment of signal processing architecture for obtaining image rotation.

FIG. 8 diagrammatically illustrates a signal processing architecture for obtaining image rotation, which may be incorporated in the image processor 22, either as hardware or software. Data read from the A/D converter 20 is coupled over an input bus 50 to a random access buffer memory (RAM) 52, which has storage capacity corresponding to at least one image (512 by 768 pixels). The orientation signal is coupled over a control bus 54 to a memory read out controller 56. The memory read out controller 56 may be a programmed part of a controller microprocessor 57 in the image processor 22, or it may be separate dedicated combinational logic driven by the microprocessor 57 for controlling the generation of read out address/clock signals for the memory 52. The address/clock signals are supplied over respective address bus links 58 and 60 to a set of associated row and column address counters 62 and 64, respectively, for controlling the rate and order in which the contents of the memory 52 are accessed. In particular, the clock signal lines allow counters 62 and 64 to be incremented (when the up/down signal is asserted) or decremented (when the up/down signal is not asserted). A similar signal processing architecture, which makes automatic use of orientation codes, is shown in U.S. Pat. No. 5,270,831, "Storage and Playback of Digitized Images in Digital Database Together with Presentation Control File to Define Image Orientation/Aspect Ratio", which is incorporated herein by reference.

Figure 9:
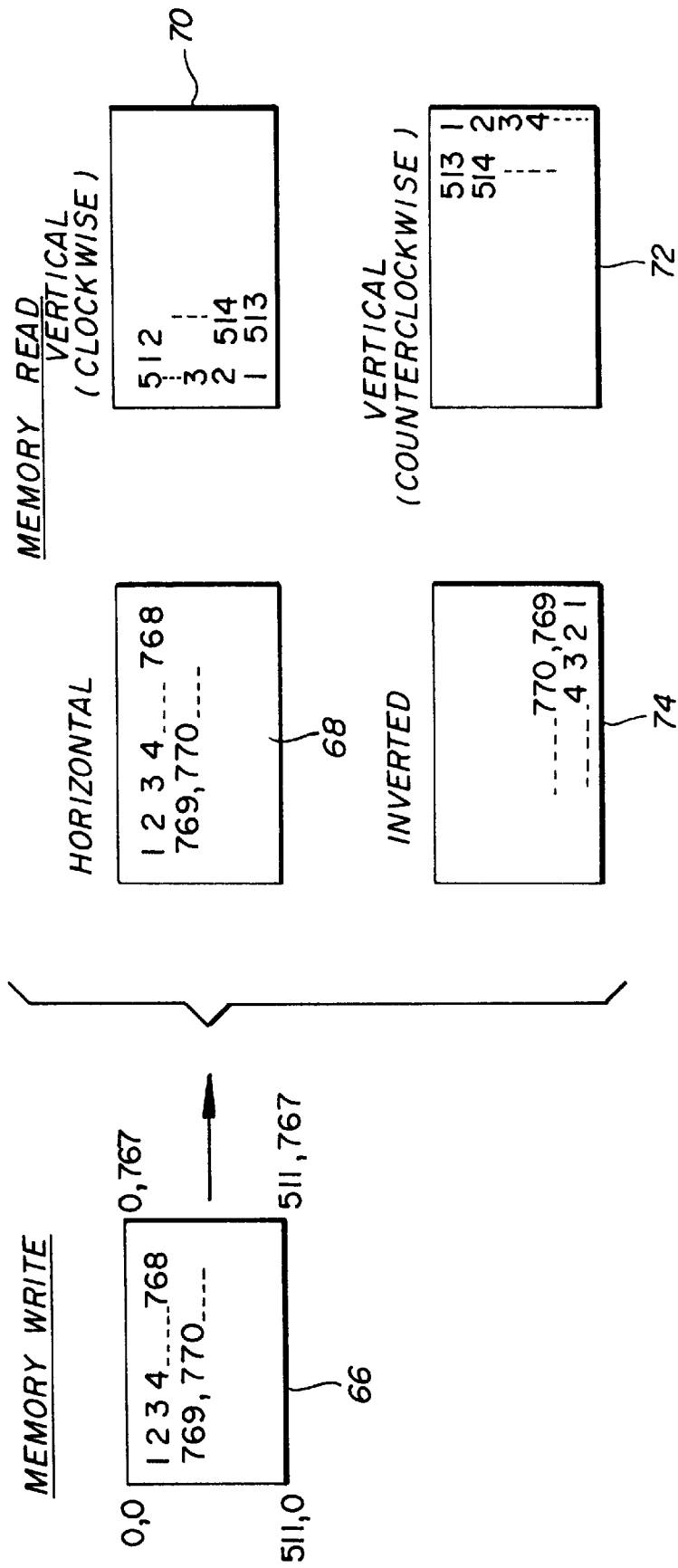
FIG. 9 is an illustration of how the architecture of FIG. 8 is employed to read a buffer memory for the various orientations.

The memory controller 56 effects reorientation of the image in the memory 52 by controlling readout of the pixel raster as shown in FIG. 9. A memory write map 66 shows the data as taken directly from the sensor 16 without regard to orientation. If the camera is horizontal, a horizontal read map 68 will be the same as the memory write map 66. However, if the camera is held in a clockwise vertical or counterclockwise vertical orientation, the memory controller 56 will begin reading the memory 52 from the bottom left or the top right, respectively, as shown in a vertical (clockwise) memory read map 70 and a vertical (counter clockwise) memory read map 72. FIG. 9 also shows the case of an inverted horizontal image, that is, an image obtained when the camera 10 is held horizontal but upside down. In this case an inverted memory read map 74 is just the inversion of the horizontal memory read map 68. (Since the latter condition is more of an accident than intentional, the camera 10 may feature a lockout or a warning mechanism (not shown), when the camera is held upside down.)

Figure 7:
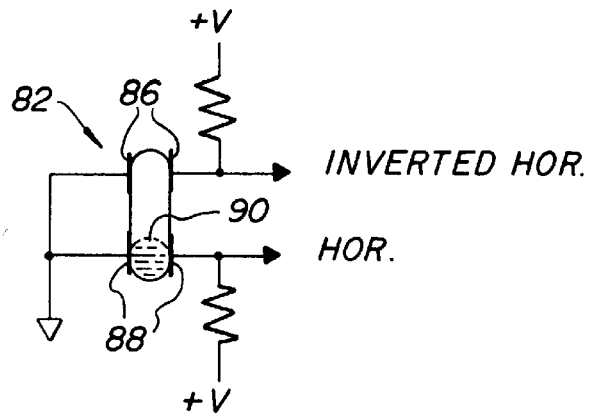
FIG. 7 shows an embodiment of orientation sensors used in the camera shown in FIG. 2.
Figure 7:
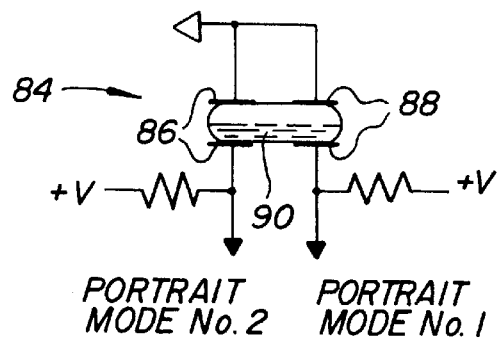

An embodiment of the orientation sensor 40 is shown in FIG. 7. Two mercury filled switches 82, 84 are mounted in the camera 10, one in a vertical orientation and one in a horizontal orientation. Each switch 82, 84 includes a first pair of switch contacts 86 and a second pair of switch contacts 88 between which a bubble of electrically conductive mercury 90 is constrained for movement. Gravity acts on the electrically conductive mercury 90 in such a way as to close one of the two switch contacts 86 or 88 of one of the two orientation sensors 82 or 84, while both switch contacts 86 and 88 of the other orientation sensor 82 or 84 are open. In this manner, three switches are always open so that the signals are at the +V (high) level, while one switch is closed so that signal is at the low (ground) level. By knowing which signal is low, the camera orientation is determined. For example, if switch contacts 88 of switch 82 are closed, the camera 10 is being held in a horizontal position. If one of the switch contacts 86 or 88 of switch 84 are closed, then the camera 10 is being held in one of the two portrait positions, and so on. The switch outputs are provided to the logic section 40, which converts the switch signals into orientation codes, e.g., 00=horizontal, 01=vertical (clockwise), and 10=vertical (counterclockwise).

FIG. 7 represents a concept for an orientation sensor. In fact, it is preferable not to use mercury at least in some applications. Another possibility includes a photointerruptor type of switch in which, for example, a light-blocking ball is entrained to move along a track, depending on camera orientation, with photoemitters and detectors at either end thereof for sensing orientation in the respective portrait positions. Alternatively, for example, a weighted light-blocking wheel can be mounted to rotate between a photo-emitter and two detectors fixed to the camera body. Light-transmitting slots are arranged in the wheel such that both detectors are blocked in the landscape position and a different one of the detectors is blocked in each portrait position.

Figure 3:
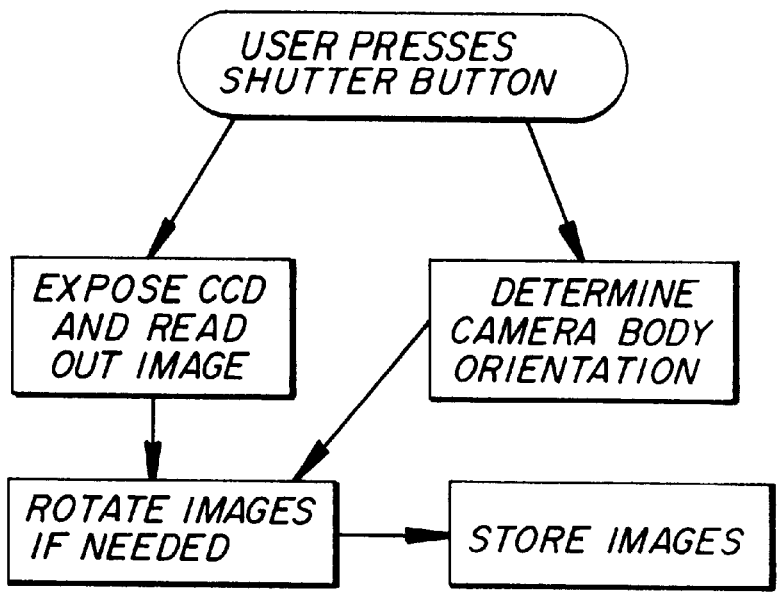
FIG. 3 is a is a flow diagram showing the operation of the camera according to the invention.
Figure 4:
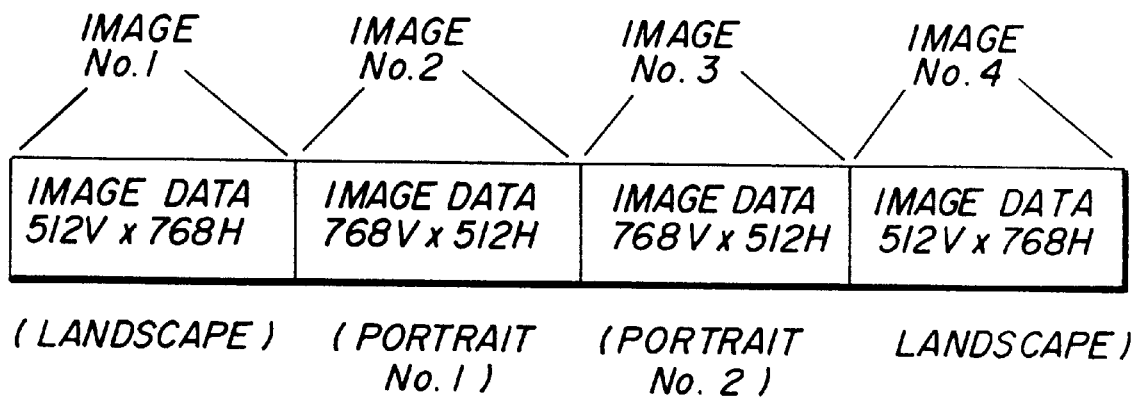
FIG. 4 shows the stored images in proper orientation according to the invention.
Figure 5:
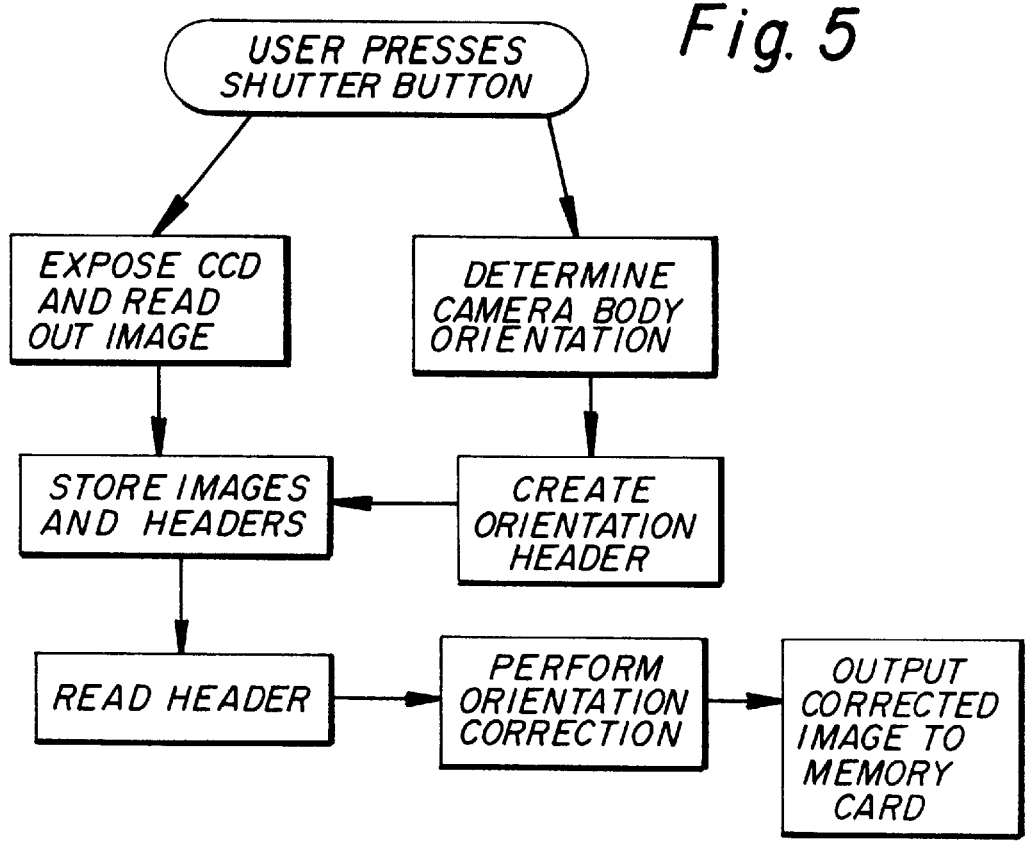
FIG. 5 is a flow diagram showing an alternative operation of the camera.
Figure 6:
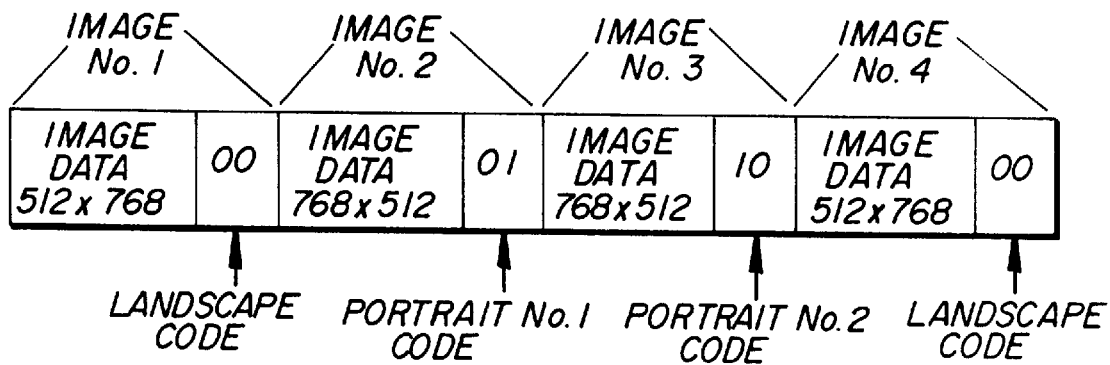
FIG. 6 shows the stored images according to the alternative operation shown in FIG. 5.

The operation of the camera is shown in FIG. 3. When the user takes the image by pressing the shutter button 44, the sensor 16 is exposed and read out while the orientation of the camera 10 is determined by the orientation determination section 36 as the image is read out from the sensor 16. Where correction is required, the image processor 22 rotates the image data, and the image data is stored in the memory card 26, in proper orientation (as shown in FIG. 4). An alternative operational embodiment is shown in FIGS. 5 and 6, in which the orientation code is stored along with each image in a header as the image data is written into the RAM memory 52. At this stage, each image remains 512(V)×768 (H), and the orientation codes indicate whether the image should be displayed in the normal landscape mode (00), or rotated clockwise when displayed, since it was taken using portrait orientation #1 (01), or rotated counterclockwise when displayed, since it was taken using portrait orientation #2 (10). As each image is read out from RAM 52, the processor 57 checks the orientation code and rotates the image, if necessary, depending on the camera orientation. Each image is thus stored in the memory card 24 in its proper orientation, as shown in FIG. 6. An advantage of the alternative embodiment is that several images, with their headers, can be captured and stored in the buffer memory 52 before the processor 57 commences image rotation. This capability facilitates a burst mode of operation, in which several images are quickly taken. Additionally, the aforementioned U.S. Pat. No. 5,270,831, which is incorporated herein by reference, discloses a suitable signal processing architecture for use in a processor to decode orientation information in the image header in the course of processing the captured image, so that the image will be stored in the memory card in an upright orientation and at the correct aspect ratio for subsequent display by a computer.

As also shown in FIG. 6, the orientation code may be stored along with the properly oriented images in the memory card 26. The stored orientation code may be useful when the memory card 26 is transferred to the computer 28, and the computer 28 performs image processing on the image. For instance, image processing for exposure control may be made sensitive to image orientation, or the codes may allow reorienting the aspect ratio of the image to obtain a portrait-like effect with, e.g., border areas. Alternatively, the camera may have an orientation on/off switch 36' to permit the camera to store uncorrected images on the memory card. Orientation correction would then be performed solely by the computer. If, however, it is desirable that all images be corrected within the camera, the switch 36' would be set to on and the camera operation flow shown in FIG. 3 would be used. In this embodiment, images are always rotated, if necessary, and the record of the original orientation is not saved in a header (except for the alternative embodiment discussed above).

The invention has been described with reference to a preferred embodiment. However, it will be appreciated that variations and modifications can be effected by a person of ordinary skill in the art without departing from the scope of the invention.

| PARTS LIST | |
|---|---|
| 10 | electronic camera |
| 12 | lens |
| 14 | subject |
| 16 | CCD image sensor |
| 18 | CCD driver circuit |
| 20 | A/D converter |
| 22 | image processor |
| 24 | removable solid-state memory card |
| 26 | PCMCIA interface |
| 28 | computer |
| 30 | PCMCIA interface |
| 32 | central processor |
| 34 | display |
| 36 | orientation determination section |
| 38 | camera control interface |
| 40 | orientation sensor |
| 42 | logic section |
| 44 | shutter button |
| 50 | input bus |
| 52 | RAM buffer memory |
| 54 | control bus |
| 56 | memory readout controller |
| 57 | controller microprocessor |
| 58 | address bus link |
| 60 | address bus link |
| 62 | row address counter |
| 64 | column address counter |
| 66 | memory write map |
| 68 | horizontal memory read map |
| 70 | vertical (clockwise) memory read map |
| 72 | vertical (counterclockwise) memory read map |
| 74 | inverted memory read map |
| 82 | mercury switch |
| 84 | mercury switch |
| 86 | switch contacts |
| 88 | switch contacts |
| 90 | mercury |

We claim:

1. A method operative within a camera for rotating images captured by a hand-held camera in a variety of orientations, including a horizontal "landscape" orientation and first and second vertical "portrait" orientations, one for clockwise rotation and the other for counterclockwise rotation, said method comprising the steps of:

sensing the orientation of the camera relative to a subject;

positively distinguishing a first clockwise vertical orientation and a second counterclockwise vertical orientation from the horizontal orientation;

providing a code signal indicating the first and second vertical orientations;

generating an image signal corresponding to a still image of the subject from an image sensor having a two-dimensional array of rows and columns of photosites, said rows and columns differing in number;

associating the image signal with its corresponding code signal;

processing the image signal in response to the code signal by re-ordering the rows and columns of image data in order to rotate the image by 90 degrees counterclockwise in the first vertical orientation and 90 degrees clockwise in the second vertical orientation to correct the first and second vertical orientations thereof, and provide a processed image signal that is output in a predetermined horizontal orientation, whereby the number of columns of image data stored for pictures taken in the vertical orientation is different than the number of columns of image data stored for pictures taken in the horizontal orientation; and storing the image signal in a memory for subsequent access by a display device, whereby the processed still image will always be displayed in the horizontal orientation.

2. A method as claimed in claim 1 wherein the number of columns output for vertical orientations is substantially equal to the number of rows output for horizontal orientations, and the number of rows output for vertical orientations is substantially equal to the number of columns output for horizontal orientations.

* * * * *